United States Patent [19]
Takagi et al.

[11] Patent Number: 6,141,503
[45] Date of Patent: Oct. 31, 2000

[54] VISUAL FIELD OF FINDER CHANGE-OVER APPARATUS

[75] Inventors: Tetsuya Takagi, Akiruno; Yukihiko Sugita, Kokubunji; Wataru Koide, Hachioji, all of Japan

[73] Assignee: Olympus Optical Co., Ltd., Tokyo, Japan

[21] Appl. No.: 09/364,829

[22] Filed: Jul. 30, 1999

[30] Foreign Application Priority Data

Aug. 5, 1998 [JP] Japan .................................. 10-221750

[51] Int. Cl.[7] .................................................. G03B 13/10
[52] U.S. Cl. ........................................................ 396/380
[58] Field of Search .................................. 396/380, 378, 396/435, 436

[56] References Cited

U.S. PATENT DOCUMENTS

| | | | |
|---|---|---|---|
| 5,592,252 | 1/1997 | Kobayashi et al. | 396/380 |
| 5,623,324 | 4/1997 | Dassero et al. | 396/380 |
| 5,732,298 | 3/1998 | Nishizawa et al. | 396/380 |
| 5,970,267 | 10/1999 | Inazuka et al. | 396/380 |

FOREIGN PATENT DOCUMENTS 6-82882 3/1994 Japan .
9-203933 8/1997 Japan .

*Primary Examiner*—W. B. Perkey
*Attorney, Agent, or Firm*—Frishauf, Holtz, Goodman, Langer & Chick, P.C.

[57] ABSTRACT

A visual field of finder change-over apparatus for changing over a size and shape of a visual field of finder of a camera in a plurality of stages, includes a pair of first visual-field frame members which are movable relative to the visual field of finder in two opposite directions and each of which has an approximately arc-shaped cam slot, a pair of second visual-field frame members which are movable relative to the visual field of finder, and in further two opposite directions, the further two opposite directions crossing the two opposite directions, and each of which has an approximate arc-shaped cam slot, and a rotation member which is rotatable and has a plurality of pins fitted in the cam slots of the first and second visual-field frame members, the rotation member selectively moving the first and second visual-field frame members by a movement of the moving pins when the rotation member rotates, wherein at least one of the pairs of the first and second visual-field frame members is moved in accordance with the rotation of the rotation member.

18 Claims, 7 Drawing Sheets

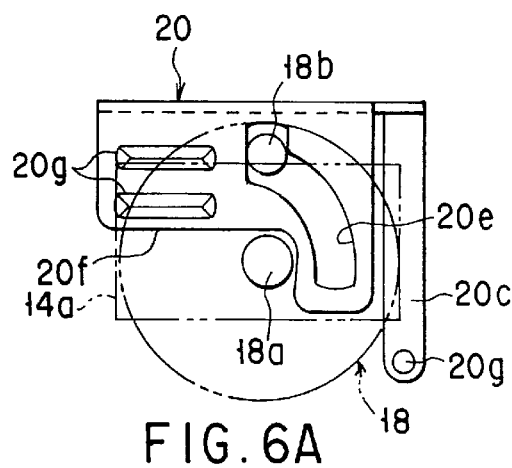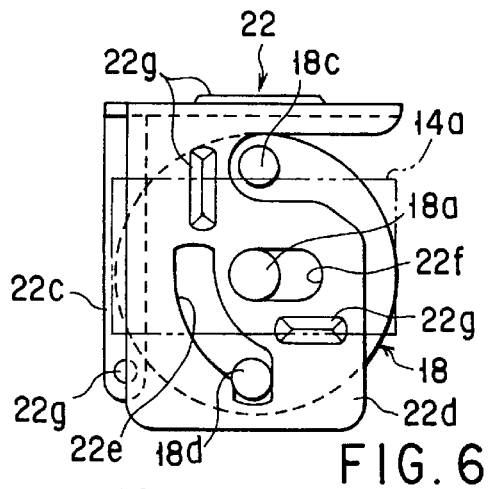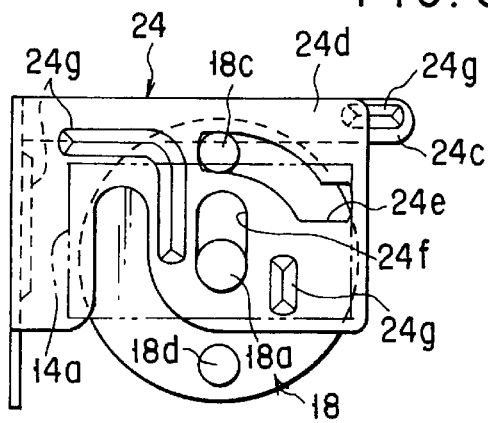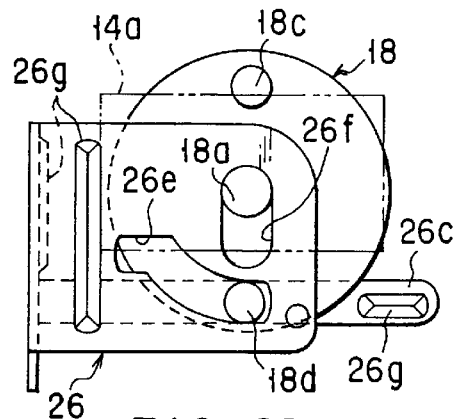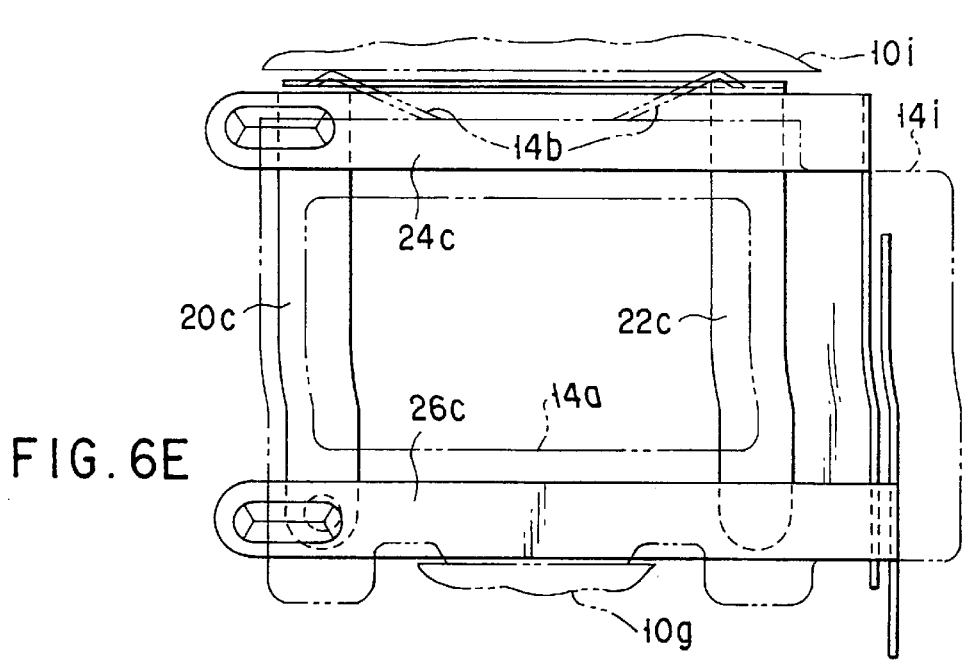

VISUAL FIELD OF FINDER CHANGE-OVER APPARATUS

BACKGROUND OF THE INVENTION

The present invention relates to a visual field of finder change-over apparatus for changing over a size and shape of a visual field of finder in a plurality of stages.

A visual field of finder change-over apparatuses have been widely known from, for example, Jpn. Pat. Appln. KOKAI Publication No. 6-82882 and Jpn. Pat. Appln. KOKAI Publication No. 9-203933.

The visual field of finder change-over apparatus of Jpn. Pat. Appln. KOKAI Publication No. 6-82882 comprises a visual field change-over lever which has an annular shape to surround a rectangular visual field of finder of a predetermined size, and a pair of L-shaped and inverted L-shaped visual-field change-over frames both of which are connected to the change-over lever at an outer periphery of the change-over lever. One of the frames extends along two adjacent orthogonal sides among four sides of the visual field of finder, and the other frame extends along the remaining two adjacent orthogonal sides. The pair of visual-field change-over frames move along one diagonal line of the visual field of finder when the change-over lever moves by a predetermined distance in one direction or the other direction from a predetermined reference position.

In this conventional visual field of finder change-over apparatus, the pair of visual-field change-over frames are retracted to the outside of the visual field of finder when the change-over lever is disposed in the reference position. The size ratio of the two adjacent orthogonal sides of the visual field of finder is what is called a high-vision size ratio (for example, the size ratio of the short side to the large side is approximately 1:1.8).

When the change-over lever is moved by the predetermined distance from the reference position in one direction, the pair of visual-field change-over frames move in one direction and in the other direction along the above-described one diagonal line. As a result of this, one pair of visual-field change-over frames move such that they close to each other along one (that is, the long sides) of the pairs of sides of the rectangular visual field of finder, and at the same time move such that they go away from each other along the other pairs (that is, the short sides) of sides of the rectangular visual field of finder. Thus, only the size along the long sides of the visual field of finder is shortened. In this case, the size ratio of the two adjacent orthogonal sides of the visual field of finder is what is called a standard size ratio (for example, the size ratio of the short side to the large side is approximately 1:1.5 or 1:1.4).

Further, when the change-over lever is moved by the predetermined distance from the reference position in the other direction, the pair of visual-field change-over frames move in the other direction and in the one direction along the above-described one diagonal line. As a result of this, one pair of visual-field frames move such that they go away from each other along one (that is, the long sides) of the pairs of sides of the rectangular visual field of finder, and at the same time move such that they close to each other along the other (that is, the short sides) of the pairs of sides of the rectangular visual field of finder. Thus, only the size along the short sides of the visual field of finder is shortened. In this case, the size ratio of the two adjacent orthogonal sides of the visual field of finder is what is called a panorama size ratio (for example, the size ratio of the short side to the large side is approximately 1:2.78 or 1:3.2.).

The visual field of finder change-over apparatus of Jpn. Pat. Appln. KOKAI Publication No. 9-203933 comprises a pair of L-shaped and inverted L-shaped visual-field change-over frames which are disposed in both corners of a rectangular visual field of finder having predetermined sizes, the both corners facing each other along one diagonal line of the finder, and a ring member which is disposed to surround the visual field of finder and to be movable in one direction and the other direction around the visual field of finder, and which is connected to the pair of visual-field frame change-over frames.

When the ring member is disposed in a moving end in the above-described one direction, the pair of visual-field change-over frames are rotated to make their long sides project into the visual field of finder beyond a pair of long sides of the visual field of finder, and, at the same time, to make their short sides go away from a pair of short sides of the visual field of finder. As a result of this, the length of each of the pair of short sides of the visual field of finder is shortened and the length of each of the pair of long sides of the visual field of finder is not changed. In this case, the size ratio between the two adjacent orthogonal sides (that is, that of the short side to the long side) is what is called the panorama size ratio.

When the ring member is disposed in a moving end in the above-described other direction, the pair of visual-field change-over frames are rotated to make their short sides project into the visual field of finder beyond the pair of short sides of the visual field of finder, and, at the same time, to make their long sides go away from the pair of long sides of the visual field of finder. As a result of this, the length of each of the pair of long sides of the visual field of finder is shortened and the length of each of the pair of short sides of the visual field of finder is not changed. In this case, the size ratio between the two adjacent orthogonal sides (that is, that of the short side to the long side) is what is called the standard size ratio.

When the ring member is disposed in a reference position between the moving end in the one direction and the moving end in the other direction, the pair of visual-field change-over frames make their long sides dispose away from the pair of long sides of the visual field of finder, and, at the same time, make their short sides dispose away from the pair of short sides of the visual field of finder. The size ratio between the two adjacent orthogonal sides (that is, that of the short side to the long side) of the visual field of finder is what is called the high-vision size ratio.

In both conventional examples described above, one pair of visual-field change-over frames move largely in the outside of the visual field of finder when the size and shape of the visual field is changed over. In other words, in both conventional examples described above, a large space is required at the outside of the visual field of finder in order to operate the pair of visual-field change-over frames, for the purpose of changing over the size and shape of the visual field of finder. And, this results in an increase in the external dimensions of the visual field of finder change-over apparatus.

This invention is derived from the above-described situation, an object of the present invention is to provide a visual field of finder change-over apparatus that requires a smaller operation space than that of the prior-art examples, to make it possible to reduce external dimensions of the visual field of finder change-over apparatus.

BRIEF SUMMARY OF THE INVENTION

In order to achieve the above-described object of the present invention, a visual field of finder change-over apparatus according to a first aspect of the invention, comprising:

a pair of first visual-field frame members which are movable relative to the visual field of finder in two opposite directions and each of which has an approximately arc-shaped cam slot;

a pair of second visual-field frame members which are movable relative to the visual field of finder in further two opposite directions, the further two opposite directions crossing the above-described two opposite directions, and each of which has an approximately arc-shaped cam slot; and a rotation member which is rotatable and has a plurality of pins fitted in the cam slots of the first and second visual-field frame members, the rotation member selectively moving the first and second visual-field frame members by a movement of the pins when the rotation member rotates, wherein at least one of the pairs of the first and second visual-field frame members is moved in accordance with the rotation of the rotation member.

In order to achieve the above-described object of the invention, a visual field of finder change-over apparatus according to a second aspect of the invention, comprising:

a fixed visual-field frame member which has a rectangular opening defined by a pair of short sides and a pair of long sides;

a pair of first visual-field frame members which are movable along the pair of short sides of the opening of the fixed visual-field frame member between retracted positions located in an outside of the opening of the fixed visual-field frame member and projecting positions projected within the opening and covering the pair of long sides;

a pair of second visual-field frame members which are movable along the pair of long sides of the opening of the fixed visual-field frame member between retracted positions located in the outside of the opening of the fixed visual-field frame member and projecting positions projected within the opening and covering the pair of short sides; and a visual field frame setting unit which includes an approximately arc-shaped cam slot provided in each of first and second visual-field frame members and a rotation member being rotatable and having an engagement means engaged with the cam slots, the rotation member selectively moving the first and second visual-field frame members between three modes by a movement of the engagement means when the rotation member rotates, the three modes including a first visual field frame mode in which the first visual-field frame members are disposed in the retracted positions and the second visual-field frame members are also disposed in the retracted positions, a second visual field frame mode in which the first visual-field frame members are disposed in the projecting positions and the second visual-field frame members are disposed in the retracted positions, and a third visual field frame mode in which the first visual-field frame members are disposed in the retracted positions and the second visual-field frame members are disposed in the projecting positions.

In order to achieve the above-described object of the invention, a visual field of finder change-over apparatus according to a third aspect of the invention, comprising:

four visual-field frame members each of which has an approximately arc-shaped cam slot; and a rotation member which is rotatable and has a driving means fitted with the cam slots and selectively moving the visual-field frame members by a movement of the driving means in accordance with the rotation of the rotation member.

In order to achieve the above-described object of the invention, a visual field of finder change-over apparatus according to a fourth aspect of the invention, comprising:

a pair of first visual-field frame members which are movable relatively to a visual field of finder in right and left directions and each of which has an approximately arc-shaped cam slot;

a pair of second visual-field frame members which are movable relative to the visual field of finder in up and down directions and each of which has an approximately arc-shaped cam slot; and a rotation member which is rotatable and has pins fitted in the cam slots of the first and second visual-field frame members.

In order to achieve the above-described object of the invention, a visual field of finder change-over apparatus according to a fifth aspect of the invention, comprising:

a fixed visual-field frame member which has a rectangular opening defined by a pair of short sides and a pair of long sides;

a pair of first visual-field frame members which are movable along the pair of short sides of the opening of the fixed visual-field frame member between retracted positions located in an outside of the opening of the fixed visual-field frame member and projecting positions projected within the opening and covering the pair of long sides;

a pair of second visual-field frame members which are movable along the pair of long sides of the opening of the fixed visual-field frame member between retracted positions located in the outside of the opening of the fixed visual-field frame member and projection positions projected within the opening and covering the pair of short sides; and a visual field frame setting unit which selectively moves the first and second visual-field frame members between three modes, the three modes including a first visual field frame mode in which the first visual-field frame members are disposed in the retracted positions and the second visual-field frame members are also disposed in the retracted positions, a second visual field frame mode in which the first visual-field frame members are disposed in the projecting positions and the second visual-field frame members are disposed in the retracted positions, and a third visual field frame mode in which the first visual-field frame members are disposed in the retracted positions and the second visual-field frame members are disposed in the projecting positions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

A visual field of finder change-over apparatuses according to the above-described invention will be understood more in detail from the following description with reference to attached drawings in which:

FIGS. 6A to 6D are views schematically showing a state from behind the rotation member, in which one of the pair of second visual-field frame members and the other second visual-field frame member are disposed respectively in projecting positions and one of the pair of first visual-field frame members and the other first visual-field frame member are disposed respectively in the retracted positions with respect to the rectangular visual field of predetermined sizes of the fixed visual-field frame member, while a third visual field frame mode is being set when the rotation member is disposed in a third visual field frame setting position in the visual field of finder change-over apparatus of FIG. 2;

FIG. 6E is a view schematically showing the state from the front side of the fixed visual-field frame member, in which one of the pair of second visual-field frame members and the other second visual-field frame member are disposed respectively in the projecting positions and one of the pair of first visual-field frame members and the other first visual-field frame member are disposed respectively in the retracted positions with respect to the rectangular visual field of predetermined sizes of the fixed visual-field frame member, while the third visual field frame mode is being set when the rotation member is disposed in the third visual field frame setting position in the visual field of finder change-over apparatus of FIG. 2;

DETAILED DESCRIPTION OF THE INVENTION

Figure 1:
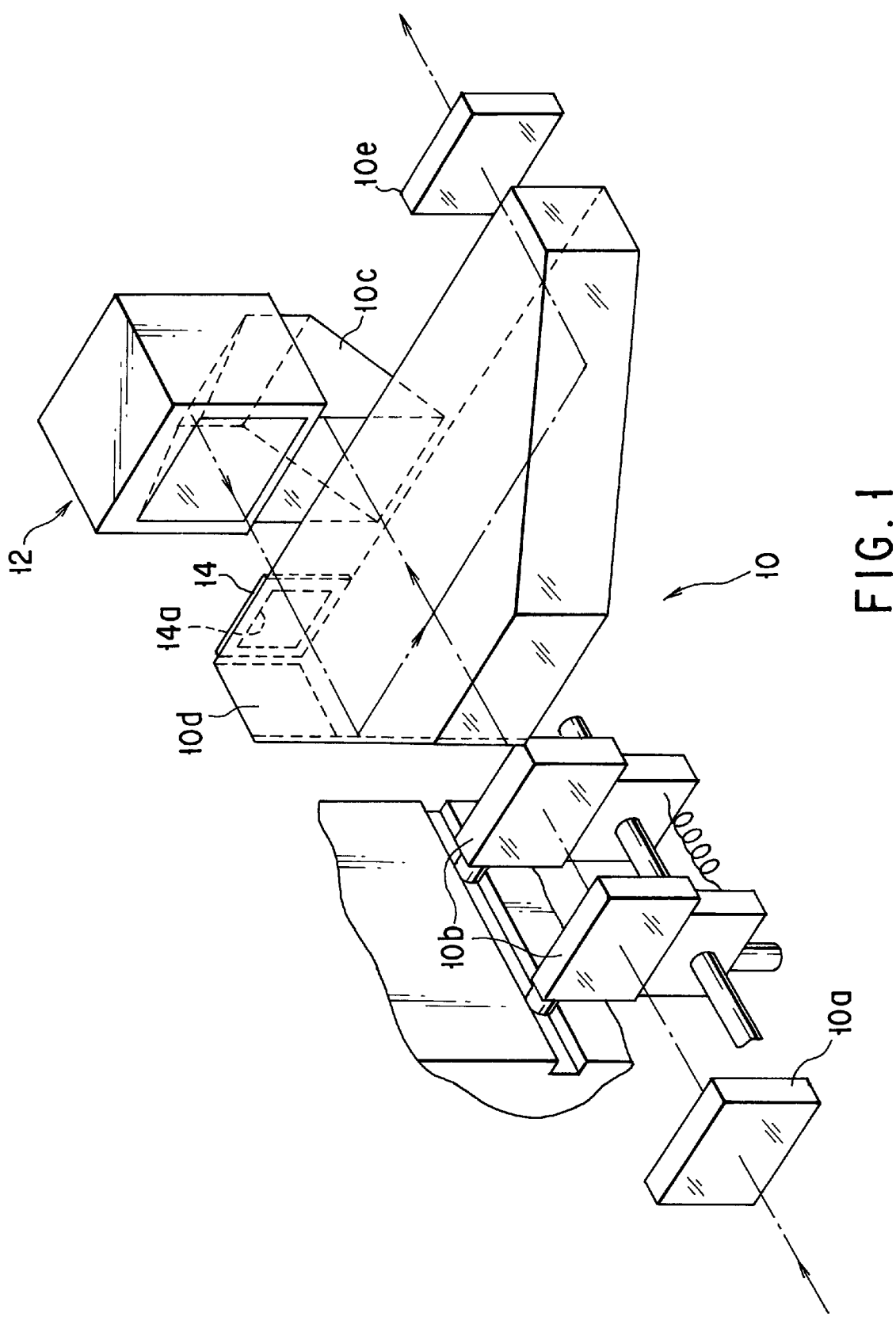
FIG. 1 is a schematic perspective view showing a main portion of a finder unit to which one embodiment of a visual field of finder change-over apparatus according to the present invention is applied.

FIG. 1 is a schematically perspective view showing a main portion of a finder unit 10 to which one embodiment of a visual field of finder change-over apparatus of the present invention is applied.

The finder unit 10 shown in FIG. 1 is a variable magnification finder unit and is installed within an outer housing (not shown) of an optical device such as a camera, for example. In FIG. 1, an optical axis of the finder unit 10 is indicated by a one-dot chain line with arrow marks.

The finder unit 10 comprises an objective lens 10a disposed in the front surface of the outer housing (not shown), a plurality of zoom lenses 10b disposed immediately behind the objective lens 10a, a vertical rectangular prism 10c disposed at the back of the plurality of zoom lenses 10b, a horizontal rectangular prism 10d disposed in front of the vertical rectangular prism 10c and above the plurality of zoom lenses 10b, and an eyepiece 10e disposed in one side of the vertical rectangular prism 10c and in the back of the horizontal rectangular prism 10d.

In the finder unit 10, the plurality of zoom lenses 10b move within a predetermined range along the optical axis of the finder unit 10 passed through the objective lens 10a, to change the magnification of an inverted right-and-left opposite image of an object incident from the objective lens 10a within a predetermined range. The vertical rectangular prism 10c and the horizontal rectangular prism 10d constitute a porro-prism for returning to a normal right-and-left correct image from the inverted right-and-left opposite image which is inverted and exchanged right and left to each other from the image of the object incident from the object lens 10a and the magnification of which was changed by the plurality of zoom lenses 10b. The eyepiece 10e is disposed in the rear surface of the outer housing (not shown) and is used to look at the image of the object, the image being returned to the normal left-and-right correct image in the vertical and horizontal rectangular prisms 10c and 10d. In the present embodiment, the eyepiece 10e can be moved within a predetermined range along the optical axis of the finder unit 10 passing through the eyepiece 10e, in order to adjust an eye sight of the eyepiece 10e.

In the following description, up and down and right and left are determined in a case where the finder unit 10 shown in FIG. 1 is looked at from the eyepiece 10e side, that is, from the back side.

In this embodiment, the visual field of finder change-over apparatus is installed on the upper half portion of the vertical rectangular prism 10c, which faces the horizontal rectangular prism 10d. In FIG. 1, only a supporting frame 12 for the visual field of finder change-over apparatus is shown schematically. A fixed visual-field frame member 14 is fixed to a portion of the horizontal rectangular prism 10d, which faces the upper half portion of the vertical rectangular prism 10c. The fixed visual-field frame member 14 has a visual field of finder 14a structured by a rectangular opening having predetermined sizes.

Figure 2:
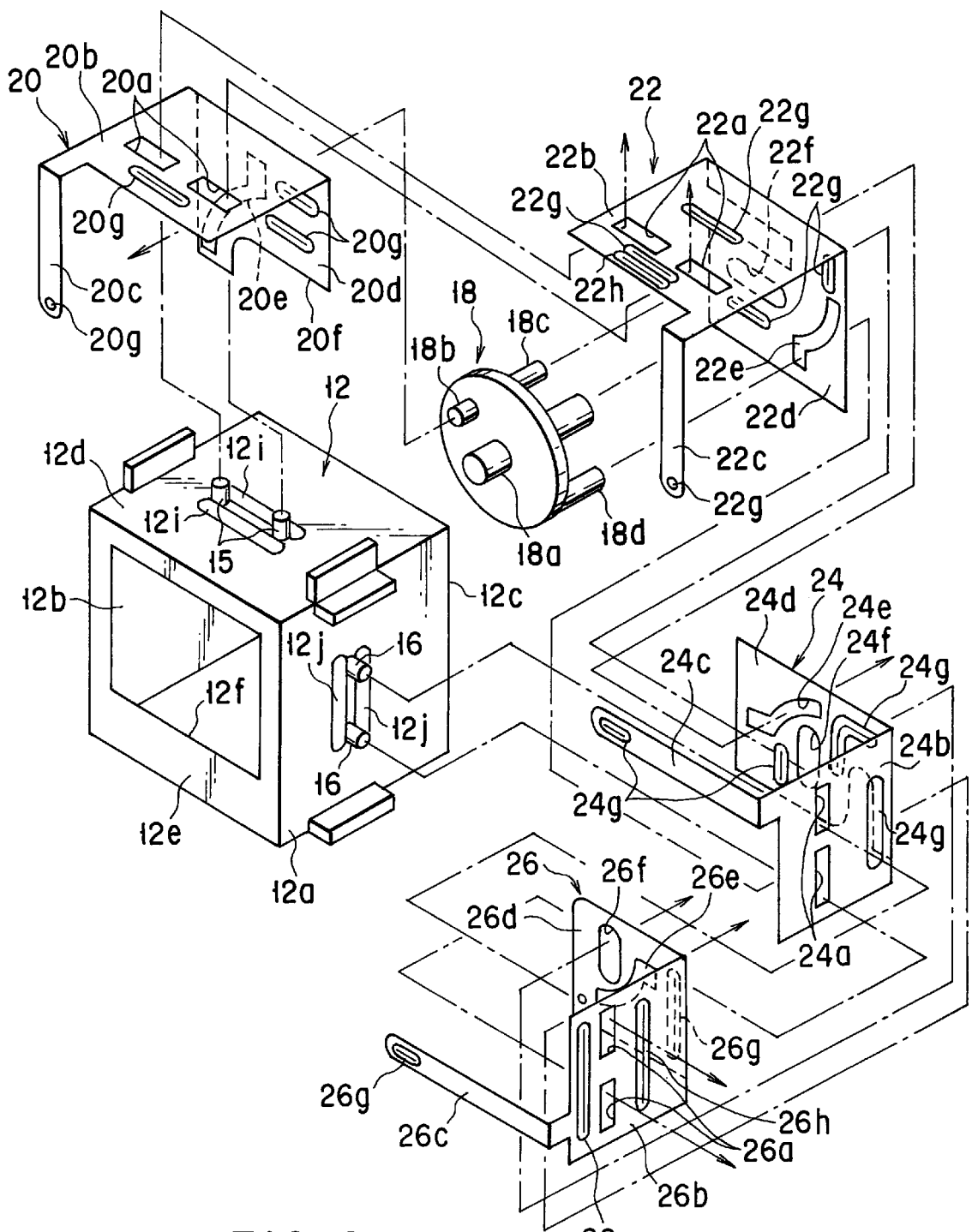
FIG. 2 is a schematically exploded perspective view of the one embodiment of the visual field of finder change-over apparatus according the invention, viewed from the front side at a left above angle.
Figure 3:
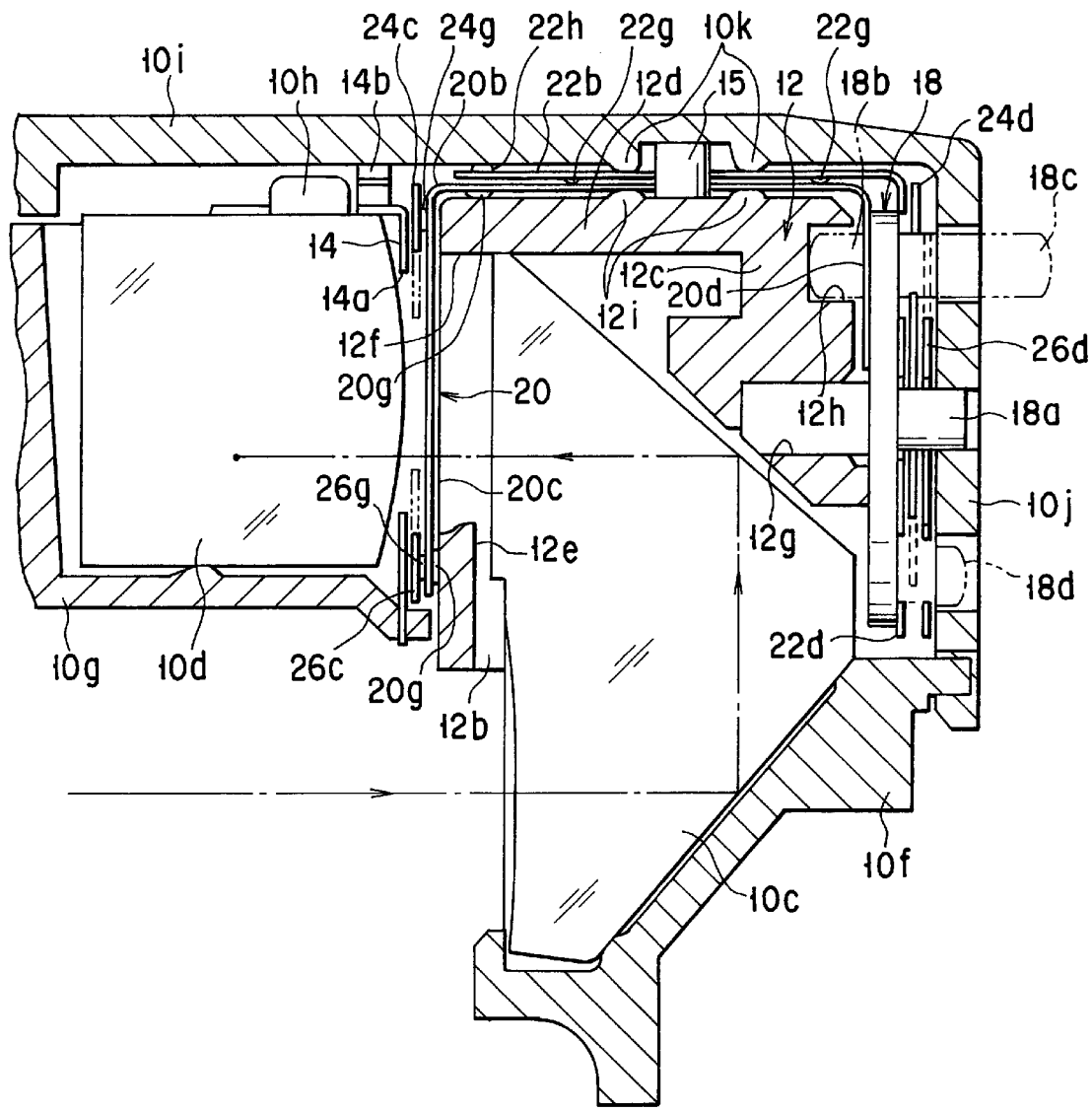
FIG. 3 is a schematically vertical cross-sectional view of the visual field of finder change-over apparatus of FIG. 2 and a fixed visual-field frame member and a horizontal rectangular prism, both of which face the visual field of finder change-over apparatus as shown in FIG. 1.
Figure 4:
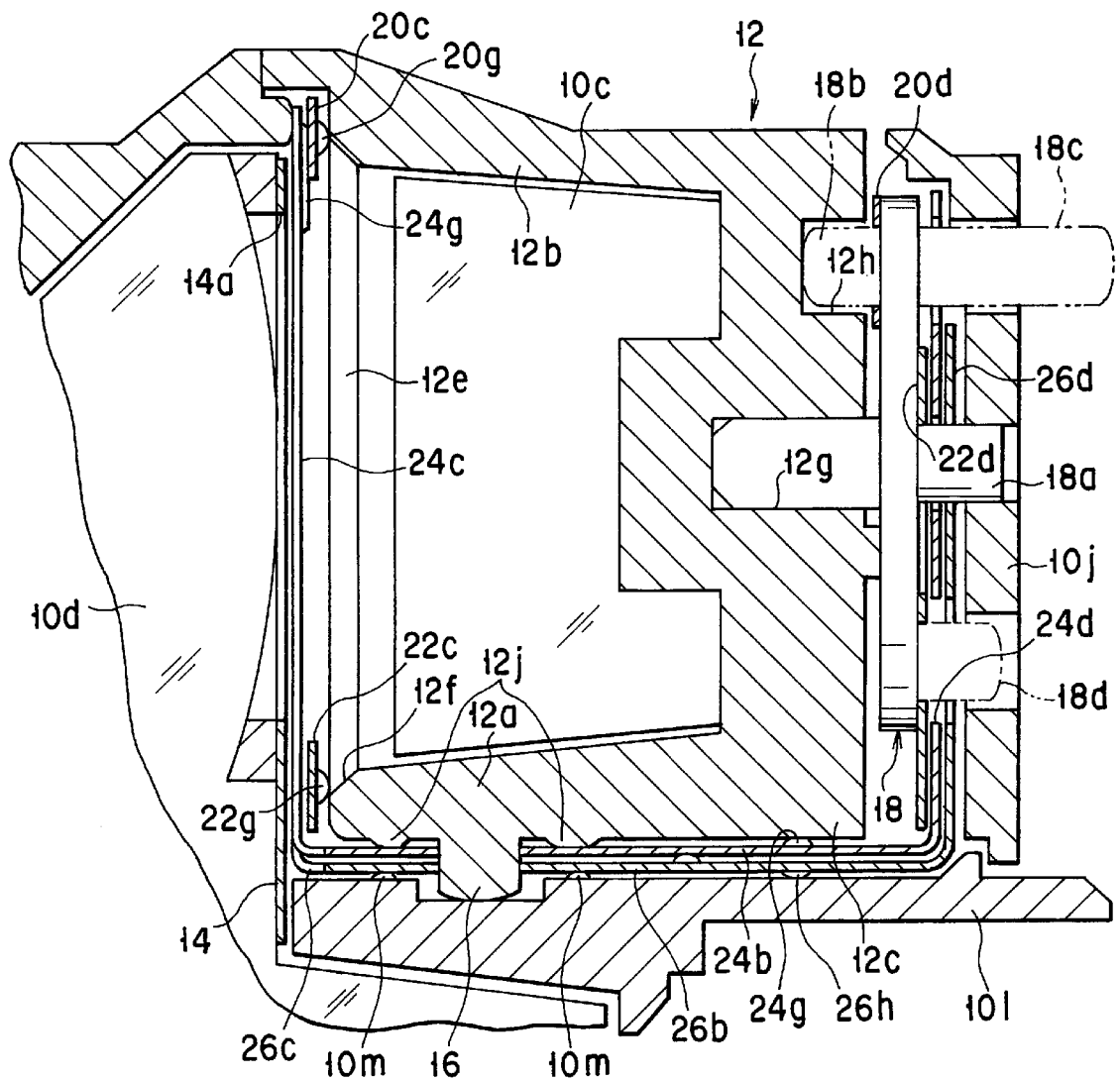
FIG. 4 is a schematically horizontal cross-sectional view of the visual field of finder change-over apparatus of FIG. 2 and the fixed visual-field frame member and the horizontal rectangular prism, both of which face the visual field of finder change-over apparatus as shown in FIG. 1.

Now, a structure of the embodiment of the visual field of finder change-over apparatus according to the present invention will be described in detail with reference to FIGS. 2 to 4. FIG. 2 is a schematically exploded perspective view of the embodiment of the visual field of finder change-over apparatus according to the present invention, viewed from the front side at a left above angle. FIG. 3 is a schematic vertical cross-sectional view of the visual field of finder change-over apparatus of FIG. 2 and the fixed visual-field frame member and the horizontal rectangular prism, both of which face the visual field of finder change-over apparatus as shown in FIG. 1. FIG. 4 is a schematic horizontal cross-sectional view of the visual field of finder change-over apparatus of FIG. 2 and the fixed visual-field frame member and the horizontal rectangular prism, both of which faces the visual field of finder change-over apparatus as shown in FIG. 1.

As shown in FIG. 3, the vertical rectangular prism 10c has its lower half portion supported by a vertical rectangular prism supporting base 10f of the finder unit 10. The visual field of finder change-over apparatus of the present embodiment has the supporting frame 12 covered on the upper half portion of the vertical rectangular prism 10c.

As shown in FIG. 2, the supporting frame 12 includes left and right side walls 12a and 12b for covering left and right side surfaces of the upper half portion of the vertical rectangular prism 10c (see FIGS. 1 and 3), a rear wall 12c for covering the rear surface of the upper half portion, an upper wall 12d for covering the upper surface of the upper half portion, and a front wall 12e for only covering a peripheral portion of the front surface of the upper half portion. In the front wall 12e, a rectangular opening 12f is formed. The opening 12f is larger than the visual field of finder 14a of the fixed visual-field frame member 14 facing the front surface of the upper half portion of the vertical rectangular prism 10c (see FIGS. 1 and 3).

FIG. 3 also shows a state in which the horizontal rectangular prism 10d is mounted on a horizontal rectangular prism supporting base 10g of the finder unit 10. FIG. 3 further shows a state in which the fixed visual-field frame member 14 is positioned in the front and back and left and right directions on the upper surface of the horizontal rectangular prism 10d and the fixed visual-field frame member 14 is positioned in the up and down directions. More specifically, the positioning in the front and back and left and right directions is carried out by the combination of positioning projections 10h on the upper surface of the horizontal rectangular prism 10d and positioning holes (not shown) of the fixed visual-field frame member 14. The positioning in the up and down directions is carried out by elastic arms 14b extending upward from the fixed visual-field frame member 14 and brought into contact with the lower surface of an upper wall 10i of a cover for covering the finder unit 10. The elastic arms 14b press the fixed visual-field frame member 14 by its own elasticity to the upper surface of the horizontal rectangular prism 10d.

As shown in FIG. 2, a pair of movement guide projections 15 are provided on a substantially flat upper surface of the upper wall 12d of the supporting frame 12, and a pair of movement guide projections 16 are provided on a substantially flat left side surface of the left side wall 12a of the supporting frame 12. The pair of movement guide projections 15 on the upper wall 12d are separated from each other in the right and left directions by a predetermined distance, and the pair of movement guide projections 16 on the left side wall 12a are separated in the up and down directions by a predetermined distance.

As shown in FIGS. 3 and 4, a rotation center hole 12g is formed at approximately the center of the rear surface of the rear wall 12c of the supporting frame 12, and a rotation member 18 is disposed on the rear surface.

As shown in FIGS. 2 to 4, the rotation member 18 has a disk shape with a smaller diameter than the vertical and lateral sizes of the front wall 12e of the supporting frame 12. The rotation member 18 also has a rotation center shaft 18a rotatably supported in the rotation center hole 12g on the rear wall 12c of the supporting frame 12. A first driving pin 18b extends in parallel to the rotation center shaft 18a from a predetermined position on the front surface of the rotation member 18, and a second driving pin 18c extends coaxially with the first driving pin 18b from the rear surface of the rotation member 18. Further, a third driving pin 18d extends in parallel to the rotation center shaft 18a from a position on the rear surface, which is on a concentric circle on which the second driving pin 18c is positioned but is symmetrical with the second driving pin 18c with respect to the rotation center shaft 18a.

The rotation center shaft 18a and the first to third driving pins 18b, 18c and 18d of the rotation member 18 extend respectively in parallel with a part of the optical axis of the finder unit 10 in FIG. 1, the part extending in the upper half portion of the vertical rectangular prism 10c (in FIG. 1) covered with the supporting frame 12 from the side of the rear wall 12c of the supporting frame 12 toward the opening 12f of the front wall 12e of the supporting frame 12.

In the rear surface 12c of the supporting frame 12, an approximately arc-shaped groove 12h is formed. The arc groove 12h accommodates the first driving pin 18b of the rotation member 18, and permits a movement of the first driving pin 18b within a predetermined range in a peripheral direction around the rotation center shaft 18a when the rotation member 18 is rotated around the rotation center shaft 18a. In the present embodiment, the above predetermined range is defined between a second visual field mode setting position in which the first driving pin 18b and the second driving pin 18c are disposed in the right side approximately in the horizontal direction and the third driving pin 18d is disposed in the left side approximately in the horizontal direction with respect to the rotation center shaft 18a respectively, and a third visual field mode setting position in which the first driving pin 18b and the second driving pin 18c are disposed above approximately in the vertical direction and the third driving pin 18d is disposed below approximately in the vertical direction with respect to the rotation center shaft 18a respectively. A first visual field mode setting position is defined as an intermediate position between the second visual field mode setting position and the third visual field mode setting position. In the first visual mode setting position, the first driving pin 18b and the second driving pin 18c are disposed in a right above direction and the third driving pin 18d is disposed in a left down direction with respect to the rotation center shaft 18a respectively.

As shown in FIGS. 3 and 4, the second driving pin 18c of the rotation member 18 projects backward through an opening formed on a rear wall 10j of the cover of the finder unit 10. Then, an externally exposed portion of the second driving pin 18c exposed from this opening to the outside space is operated by an operating member (not shown) provided on the external surface of the rear wall of the outer housing (not shown) of the optical device. As a result of this, the rotation member 18 can be selectively rotated between the above-described first visual field mode setting position, the second visual field mode setting position and the third visual field mode setting position.

On the upper wall 12d of the supporting frame 12, an upper wall 20b of one second visual-field frame member 20 is mounted. In the upper wall 20b a pair of movement guide holes 20a are formed, and the pair of movement guide projections 15 on the upper wall 12d of the supporting frame 12 are inserted into the guide holes 20a. The pair of movement guide holes 20a extend by a predetermined distance in the right and left directions respectively, and permit the one second visual-field frame member 20 to move relative to the pair of movement guide projections 15 within only the predetermined distance in the right and left directions.

From a right end at the front edge of the upper wall 20b of the one second visual-field frame member, a visual field frame right side defining arm (a mask portion) 20c extends downward. The visual field frame right side defining arm (the mask portion) 20c extends along the right edge of the front wall 12e of the supporting frame 12, the front wall 12e being positioned within a finder optical system of the finder unit 10.

From a rear edge of the upper wall 20b, a visual field frame right side driving piece 20d extends downward so that the visual field frame right side driving piece 20d faces the visual field frame right side defining arm 20c located in the front edge of the upper wall 20b, and the driving piece 20d and the right side defining arm 20c constitute a pair of mutually facing surfaces. The visual field frame right side driving piece 20d extends along the rear wall 12c of the supporting frame 12, the rear wall 12c being positioned in the outside of the finder optical system of the finder unit 10. Accordingly, the upper wall 20b constitutes a bridge portion for connecting the visual field frame right side defining arm 20c in the front edge and the visual field frame right side driving piece 20d in the rear edge.

In the visual field frame right side driving piece 20d, an approximately arc-shaped cam slot 20e is formed. The cam slot 20e has a radius substantially equal to a rotation radius of the first driving pin 18b on the front surface of the rotation member 18. The cam slot 20e includes a main region for drawing an arc of about ⅙ rotation upward from a horizontal line in the anti-clockwise direction, and a sub-region slightly extending linearly in the vertically up direction from an upper end of the main region. The cam slot 20e is fitted with the first driving pin 18b on the front surface of the rotation member 18.

The visual field frame right side driving piece 20d is further formed with a rotation center shaft escape cut 20f extending in the right and left directions and keeping away from the rotation center shaft 18a. The rotation center shaft escape cut 20f prevents the visual field frame right side driving piece 20d from colliding against the rotation center shaft 18a of the rotation member 18 to allow the movement of the one second visual-field frame member 20 in the right and left directions within the predetermined distance as described above.

In the one second visual-field frame member 20, a plurality of friction reduction projections 20g are formed on the upper wall 20b, the visual field frame right side defining arm 20c and the visual field frame right side driving piece 20d respectively. When the one second visual-field frame member 20 moves relatively to the supporting frame 12 within the predetermined distance, these friction reduction projections 20g reduce the friction force generated between the upper wall 20b of the frame member 12 and the upper wall 12d of the supporting frame 12, generated between the visual field frame right side defining arm 20c of the frame member 12 and the front wall 12e of the supporting frame 12, and generated between the visual field frame right side driving piece 20d of the one second visual-field frame member 20 and the front surface of the rotation member 18 and the rear surface of the rear wall 12c of the supporting frame 12.

Further, in the present embodiment, a plurality of friction reduction projections 12i are also formed on the upper wall 12d of the supporting frame 12 on which the upper wall 20b of the one second visual-field frame member 20 is mounted. The plurality of friction reduction projections 12i reduce the friction force generated between the upper wall 20b of the one second visual-field frame member 20 and the upper wall 12d of the supporting frame 12 when the upper wall 20b of the one second visual-field frame member 20 moves along the upper wall 12d of the supporting frame 12.

On the upper wall 20b of the one second visual-field frame member 20, an upper wall 22b of the other second visual-field frame member 22 is mounted. In the upper wall 22b a pair of movement guide holes 22a are formed. The pair of movement guide projections 15 on the upper wall 12d of the supporting frame 12 are inserted into the movement guide holes 22a. The pair of movement guide holes 22a extend by a predetermined distance in the right and left directions respectively, and permit the movement of the other second visual-field frame member 22 to the pair of movement guide projections 15 within only the predetermined distance in the right and left directions.

From a left end at the front edge of the upper wall 22b, a visual field frame left side defining arm (a mask portion) 22c extends downward. The visual field frame left side defining arm (the mask portion) 22c extends along the left edge of the front wall 12e of the supporting frame 12, the front wall 12e being positioned within the finder optical system of the finder unit 10.

From a rear edge of the upper wall 22b, a visual field frame left side driving piece 22d extends downward so that the visual field frame left side driving piece 22d faces the visual field frame left side defining arm 22c located in the front edge of the upper wall 22b, and the driving piece 22d and the left side defining arm 22c constitute a pair of mutually facing surfaces. The visual field frame left side driving piece 22d extends along the rear surface of the rotation member 18 positioned in the outside of the finder optical system of the finder unit 10. Accordingly, the upper wall 22b constitutes a bridge portion for connecting the visual field frame left side defining arm 22c in the front edge and the visual field frame left side driving piece 22d in the rear edge.

In the visual field frame left side driving piece 22d, an approximately arc-shaped cam slot 22e is formed. The cam slot 22e has a radius substantially equal to a rotation radius of the third driving pin 18c of the rotation member 18. The cam slot 22e includes a main region for drawing an arc of about ⅙ rotation downward from a horizontal line in the anti-clockwise direction, and a sub-region slightly extending linearly in a vertically down direction from a lower end of the main region. The cam slot 22e is fitted with the third driving pin 18d on the rear surface of the rotation member 18.

The visual field frame left side driving piece 22d is further formed with a rotation center shaft escape opening 22f into which the rotation center shaft 18a of the rotation member 18 is inserted. The rotation center shaft escape opening 22f extends in the right and left directions to prevent the left side driving piece 22d from colliding against the rotation center shaft 18a so that the other second visual-field frame member 22 can be moved in the right and left directions within the predetermined distance as described above.

A plurality of friction reduction projections 22g are formed on the upper wall 22b, the visual field frame left side defining arm 22c and the visual field frame left side driving piece 22d respectively of the other second visual-field frame member 22. When the other second visual-field frame member 22 moves in the right and left directions with respect to the supporting frame 12 within the predetermined distance, these friction reduction projections 22g reduce the friction force generated between the upper wall 22b of the frame member 22 and the upper wall 20b of the one second visual-field frame member 20, generated between the visual field frame left side defining arm 22c of the frame member 22 and the front wall 12e of the supporting frame 12, and generated between the visual field frame left side driving piece 22d of the other second visual-field frame member 22 and the rear surface of the rotation member 18.

On the left side wall 12a of the supporting frame 12, a left side wall 24b of the one first visual-field frame member 24 is mounted. On the left side wall 24b, a pair of movement guide holes 24a are formed, and the pair of movement guide projections 16 on the left side wall 12a of the supporting frame 12 are inserted into the guide holes 24a. The pair of movement guide holes 24a extend by a predetermined distance in the up and down directions respectively, and permit the one first visual-field frame member 24 to move relative to the pair of movement guide projections 16 within only the predetermined distance in the up and down directions.

From an upper end at the front edge of the left side wall 24a, a visual field frame upper side defining arm (a mask portion) 24c extends in the right direction. The visual field frame upper side defining arm 24c extends along the upper edge of the front wall 12e of the supporting frame 12, the front wall 12e being positioned within the finder optical system of the finder unit 10.

From a rear edge of the left side wall 24b, a visual field frame upper side driving piece 24d extends in the right direction so that the visual field frame upper side driving piece 24d faces the visual field frame upper side defining arm 24c located in the front edge side of the left side wall 24b, and the driving piece 24d and the upper side defining arm 24c constitute a pair of mutually facing surfaces. The visual field frame upper side driving piece 24d extends along the rear wall 12c of the supporting frame 12, the rear wall 12c being positioned at the outside of the finder optical system of the finder unit 10. Accordingly, the left side wall 24b structures a bridge portion for connecting the visual field frame upper side defining arm 24c in the front edge and the visual field frame upper side driving piece 24d in the rear edge.

The visual field frame upper side driving piece 24d is overlaid on the rear surface of the visual-field frame member left side driving piece 22d of the other second visual-field frame member 22 on the rear surface of the rotation member 18. In the upper side driving piece 24d, an approximately arc-shaped cam slot 24e is formed. The cam shot 24e has a radius substantially equal to a rotation radius of the second driving pin 18c on the rear surface of the rotation member 18. The cam slot 24e includes a main region for drawing an arc of about ⅙ rotation downward from a vertical line in the clockwise direction, and a sub-region slightly extending approximately linearly to the right in the horizontal direction from a right end of the main region. The cam slot 24e is fitted with the second driving pin 18c on the rear surface of the rotation member 18.

The visual field frame upper side driving piece 24d is further formed with a rotation center shaft escape opening 24f into which the rotation center shaft 18a of the rotation member 18 is inserted. The rotation center shaft escape opening 24f extends in the up and down directions to prevent the upper side driving piece 24d from colliding against the rotation center shaft 18a so that the one first visual-field frame member 24 can be moved in the up and down directions within the predetermined distance as described above.

A plurality of friction reduction projections 24g are formed on the left side wall 24b, the visual field frame upper side defining arm 24c and the visual field frame upper side driving piece 24d of the one first visual-field frame member 24 respectively.

When the one first visual-field frame member 24 moves relatively to the supporting frame 12 within the predetermined distance, the plurality of friction reduction projections 24g reduce the friction force generated between the left side wall 24b of the frame member 24 and the left side wall 12a of the supporting frame 12, generated between the visual field frame upper side defining arm 24c of the frame member 24 and the visual field frame right side defining arm 20c of the one second visual-field frame member 20, and generated between the visual field frame upper side driving piece 24d of the one first visual-field frame member 24 and the visual field frame left side driving piece 22d of the other second visual-field frame member 22.

In the present embodiment, a plurality of friction reduction projections 12j are also formed on the left side wall 12a of the supporting frame 12 on which the left side wall 24b of the one first visual-field frame member 24 is mounted. The plurality of friction reduction projections 12j reduce the friction force generated between the left side wall 24b of the one first visual-field frame member 24 and the left side wall 12a of the supporting frame 12 when the left side wall 24b of the one first visual-field frame member 24 moves along the left side wall 12a of the supporting frame 12.

On the left side wall 24b of the one first visual-field frame member 24, a left side wall 26b of the other first visual-field frame member 26 is mounted. On the left side wall 26b of the other first visual-field frame member 26, a pair of movement guide holes 26a are formed. The pair of movement guide projections 16 on the left side wall 12a of the supporting frame 12 are inserted into the movement guide holes 26a. The pair of movement guide holes 26a extend by a predetermined distance in the up and down directions respectively, and permit the movement of the other first visual-field frame member 26 to the pair of movement guide projections 16 within the predetermined distance in the up and down directions.

From a lower end of the front edge of the left side wall 26b, a visual field frame lower side defining arm (a mask portion) 26c extends in the right direction. The visual field frame lower side defining arm 26c extends along the lower edge of the front wall 12e of the supporting frame 12, the front wall 12e being positioned within the finder optical system of the finder unit 10.

From a rear edge of the left side wall 26b, a visual field frame lower side driving piece 26d extends in the right direction so that the visual field frame lower side driving piece 26d faces the visual field frame lower side defining arm 26c located in the front edge of the left side wall 26b, and the driving piece 25d and the lower side defining arm 26b constitute a pair of mutually facing surfaces. The visual field frame lower side driving piece 26d extends along the rear wall 12c of the supporting frame 12, the rear wall 12c being positioned in the outside of the finder optical system of the finder unit 10. Accordingly, the left side wall 26b constitutes a bridge portion for connecting the visual field frame lower side defining arm 26c in the front edge and the visual field frame lower side driving piece 26d in the rear edge.

The visual field frame lower side driving piece 26d is overlaid on the rear surface of the visual-field frame member upper side driving piece 24d of the one first visual-field frame member 24 which is overlaid on the rear surface of the visual field frame left side driving piece 22d of the other second visual-field frame member 22, on the rear surface of the rotation member 18. In the visual field frame lower side driving piece 26d, an approximately arc-shaped cam slot 26e is formed. The cam slot 26e has a radius substantially equal to the rotation radius of the third driving pin 18d on the rear surface of the rotation member 18. The cam slot 26e includes a main region for drawing an arc of about ⅙ rotation upward from a vertical line in the clockwise direction, and a sub-region slightly extending linearly to the left in the horizontal direction from a left end of the main region. The cam slot 26e is fitted with the third driving pin 18d on the rear surface of the rotation member 18.

The visual field frame lower side driving piece 26d is further formed with a rotation center shaft escape opening 26f into which the rotation center shaft 18a of the rotation member 18 is inserted. The rotation center shaft escape opening 26f extends in the up and down directions to prevent the lower side driving pieces 26d from colliding against the rotation center shaft 18a when the other first visual-field frame member 26 moves in the up and down directions within the predetermined distance as described above.

A plurality of friction reduction projections 26g are formed on the left side wall 26b, the visual field frame lower side defining arm 26c and the visual field frame lower side driving piece 26d of the other first visual-field frame member 26. When the other first visual-field frame member 26 moves within the predetermined distance with respect to the supporting frame 12, the plurality of friction reduction projections 26g reduce the friction force generated between the left side wall 26b of the frame member 26 and the left side wall 24b of the one first visual-field frame member 24, generated between the visual field frame lower side defining arm 26c of the frame member 26 and the visual field frame right side defining arm 20c of the one second visual-field frame member 20, and generated between the visual field frame lower side driving piece 26d of the other first visual-field frame member 26 and the visual field frame upper side driving piece 24d of the one first visual-field frame member.

As is clear from FIG. 3, the upper wall 20b of the one second visual-field frame member 20 and the upper wall 22b of the other second visual-field frame member 22, both of which are overlaid on the upper surface of the upper wall 12d of the supporting frame 12, are prevented from being left from the upper wall 12d of the supporting frame 12 by the upper wall 10i of the cover of the finder unit 10.

Further, in the present embodiment, a plurality of friction reduction projections 10k are formed on the inner surface of the upper wall 10i of the cover of the finder unit 10, and a further plurality of friction reduction projections 22h are formed on the upper wall 22b of the other first visual-field frame member 22, the upper wall 22b being located adjacent to the inner surface of the upper wall 10i of the cover on the upper surface of the upper wall 12d of the supporting frame 12.

The friction reduction projections 10k and the friction reduction projections 22h reduce the friction force generated between the upper wall 22b of the other second visual-field frame member 22 and the inner surface of the upper wall 10i of the cover of the finder unit 11 located adjacent to the upper wall 22b, when the other second visual-field frame member 22 moves within the predetermined distance with respect to the supporting frame 12.

Further, as shown in FIGS. 3 and 4, the visual field frame right side driving piece 20d of the one second visual-field frame member 20, the rotation member 18, the visual field frame left side driving piece 22d of the other second visual-field frame member 22, the visual field frame upper side driving piece 24d of the one first visual-field frame member 24 and the visual field frame lower side driving piece 26d of the other first visual-field frame member 26, those of which are overlaid on the rear surface of the rear wall 12c of the supporting frame 12, are prevented from being left from the rear wall 12c of the supporting frame 12 by the rear wall 10j of the cover of the finder unit 10.

Further, as is clear from FIG. 4, the left side wall 24b of the one first visual-field frame member 24 and the left side wall 26b of the other first visual-field frame member 26, both of which are overlaid on the left side surface of the left side wall 12a of the supporting frame 12, are prevented from being left from the left side wall 12a of the supporting frame 12 by a left side wall 101 of the cover of the finder unit 10.

Further, in the present embodiment, a plurality of friction reduction projections 10m and a plurality of friction reduction projections 26h are formed on the inner surface of the left side wall 101 of the cover of the finder unit 10 and on the left side wall 26b of the other first visual-field frame member 26 positioned at the outermost side on the left side wall 12a of the supporting frame 12. The friction reduction projections 10m and the friction reduction projections 26h reduce the friction force generated between the inner surface of the left side wall 101 of the cover of the finder unit 10 and the left side wall 26b of the other first visual-field frame member 26 adjacent to the inner surface of the left side wall 10e, when the other first visual-field frame member 26 moves within the predetermined distance with respect to the supporting frame 12.

Next, an operation of the embodiment of the visual field of finder change-over apparatus of the present invention structured as described above with reference to FIGS. 2 to 4 will be explained in detail with reference to FIGS. 5A to 7E.

At first, with reference to FIGS. 5A to 5E, the operation of the embodiment of the visual field of finder change-over apparatus according to the present invention will be described in detail in a state where the rotation member 18 is disposed in the above-described first visual field mode setting position.

Figure 5B:
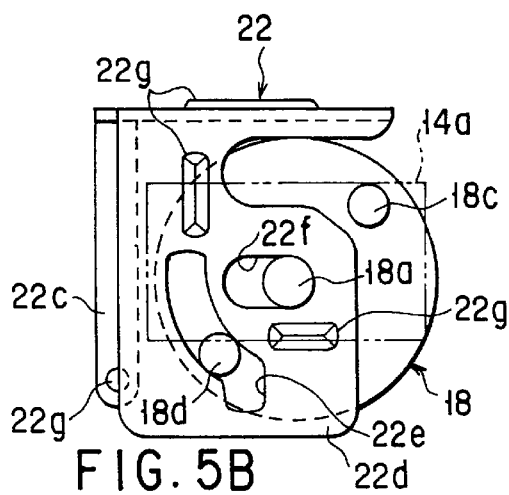
FIGS. 5A to 5D are views schematically showing a state from behind a rotation member, in which one of a pair of second visual-field frame members, the other second visual-field frame member, one of a pair of first visual-field frame members and the other first visual-field frame member are disposed respectively in retracted positions with respect to a rectangular visual field of predetermined sizes of the fixed visual-field frame member, while a first visual field frame mode is being set when the rotation member is disposed in a first visual field frame setting position in the visual field of finder change-over apparatus of FIG. 2.

FIGS. 5A to 5D schematically illustrate from behind the rotation member 18 relative positions of the one second visual-field frame member 20, the other second visual-field frame member 22, the one first visual-field frame member 24 and the other first visual-field frame member 26 with respect to the visual field of finder 14a respectively, when the rotation member 18 is disposed in the first visual field mode setting position. FIG. 5E schematically illustrates from the front side of the fixed visual-field frame member 14 relative positions of the visual field frame right side defining arm (mask portion) 20c of the one second visual-field frame member 20, the visual field frame left side defining arm (mask portion) 22c of the other second visual-field frame member 22, the visual field frame upper side defining arm (mask portion) 24c of the one first visual-field frame member 24 and the visual field frame lower side defining arm (mask portion) 26c of the other first visual-field frame member 26 with respect to the four sides of the visual field of finder 14a of the fixed visual field frame member 14 respectively, when the rotation member 18 is disposed in the first visual field mode setting position.

Figure 5A:
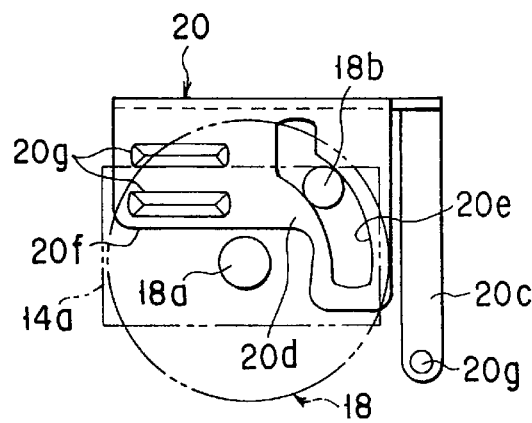

When the rotation member 18 is disposed in the above-described first visual field mode setting position, the first driving pin 18b of the rotation member 18 is positioned near the upper end of the arc-shaped main region of the cam slot 20e of the one second visual-field frame member 20, as shown in FIG. 5A. Then, a middle point of the rotation center shaft escape cut 20f of the visual field frame right side driving piece 20d in the right and left directions is positioned near to the rotation center shaft 18a. The visual field frame right side defining arm (mask portion) 20c is located in the retracted position in the outside of the right side (one of the pair of short sides) of the visual field of finder 14a.

In this case, as shown in FIG. 5B, the third driving pin 18d of the rotation member 18 is positioned near the lower end of the arc-shaped main region of the cam slot 22e of the other second visual-field frame member 22. Then, the right end of the rotation center shaft escape opening 22f of the visual field frame left side driving piece 22d is positioned near to the rotation center shaft 18a. The visual field frame left side defining arm (mask portion) 22c is located in the retracted position at the outside of the left side (the other of the pair of short sides) of the visual field of finder 14a.

Figure 5C:
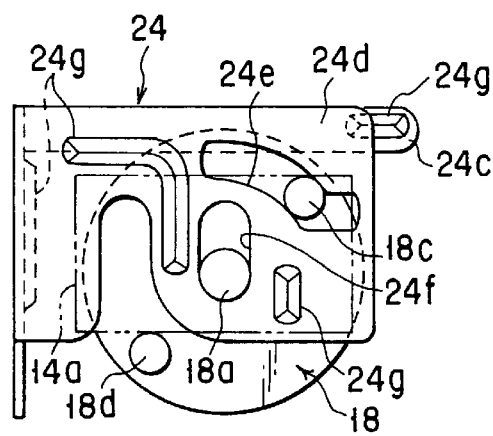

In this case, as shown in FIG. 5C, the second driving pin 18c of the rotation member 18 is positioned near the right end of the arc-shaped main region of the cam slot 22e of the one first visual-field frame member 24. Then, the lower end of the rotation center shaft escape opening 24f of the visual field frame upper side driving piece 24c is positioned near to the rotation center shaft 18a of the rotation member 18. The visual field frame upper side defining arm (mask portion) 24c is located in the retracted position in the outside of the upper side (one of the pair of long sides) of the visual field of finder 14a.

Figure 5D:
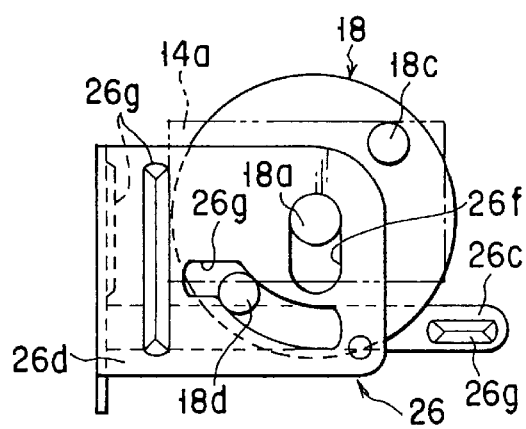
Figure 5E:
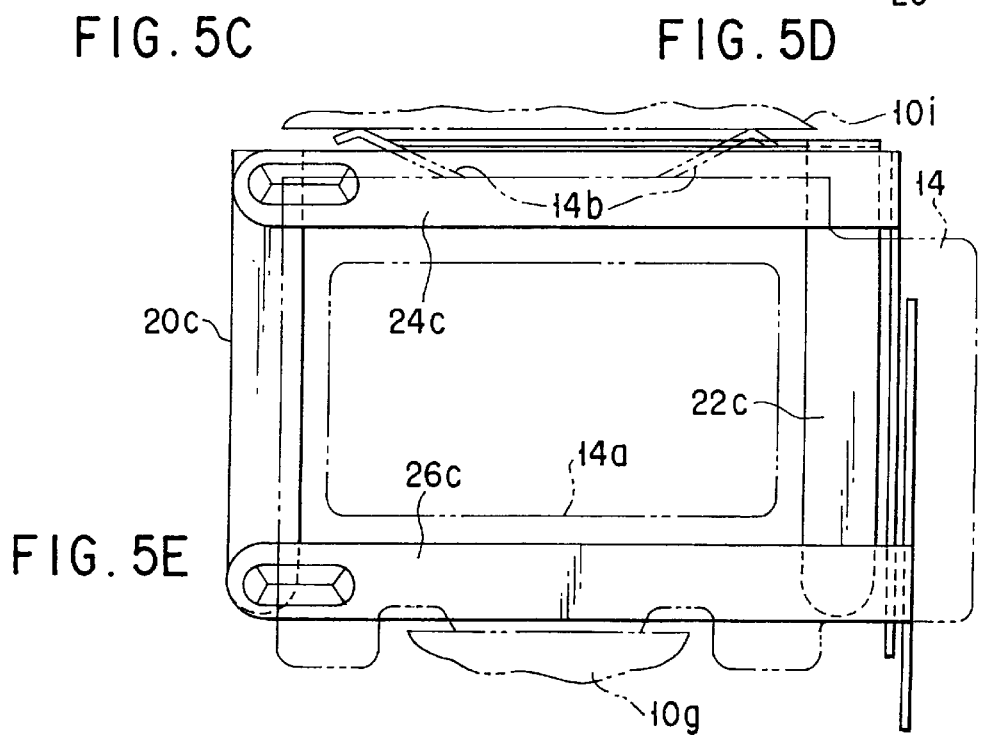
FIG. 5E is a view schematically showing the state from the front side of the fixed visual-field frame member, in which one of the pair of second visual-field frame members, the other second visual-field frame member, one of the pair of first visual-field frame members and the other first visual-field frame member are disposed respectively in the retracted positions with respect to the rectangular visual field of predetermined sizes of the fixed visual-field frame member, while the first visual field frame mode is being set when the rotation member is disposed in the first visual field frame setting position in the visual field of finder change-over apparatus of FIG. 2.

Further, in this case, as shown in FIG. 5D, the third driving pin 18d of the rotation member 18 is positioned near the left end of the arc-shaped main region of the cam slot 22e of the other first visual-field frame member 26. At this time, the upper end of the rotation center shaft escape opening 26f of the visual field frame lower side driving piece 26c is positioned near to the rotation center shaft 18a of the rotation member 18. The visual field frame lower side defining arm (mask portion) 26c is located in the retracted position in the outside of the lower side (the other of the pair of long sides) of the visual field of finder 14a.

As is clear from the above detailed description, when the rotation member 18 is disposed in the first visual field mode setting position, as shown in FIG. 5E, the visual field frame right side defining arm (mask portion) 20c and visual field frame left side defining arm (mask portion) 22c of the pair of second visual-field frame members 20 and 22 are disposed in the retracted positions respectively, and the visual field frame upper side defining arm (mask portion) 24c and visual field frame lower side defining arm (mask portion) 26c of the pair of first visual-field frame members 24 and 26 are disposed in the retracted positions respectively.

Accordingly, when an operator looked into the eyepiece 14e of the finder unit 10 shown in FIG. 1 during the above described mode, the operator can watch all the four sides (the pair of horizontal long sides and the pair of vertical short sides) of the rectangular visual field of finder 14a having predetermined sizes of the fixed visual-field frame member 14. In other words, during the mode while the rotation member 18 is disposed in the first visual field mode setting position, the original four sides of the visual field 14a define the visual field of the finder unit 10.

In the present embodiment, the ratio of the size in the vertical direction to that in the horizontal direction, that is, the ratio of the size in the width direction to that in the longitudinal direction, of the original visual field of finder 14a that can be watched from the eyepiece 10e of the finder unit 10 when the rotation member 18 is disposed in the first visual field mode setting position, is set to approximately 1:1.8 which is called as a H-type.

Next, the operation of the embodiment of the visual field of finder change-over apparatus of the present invention when the rotation member 18 is rotated from the above-described first visual field mode setting position illustrated in FIGS. 5A to 5D to the above described third visual field mode setting position, will be described in detail with reference to FIGS. 6A to 6E.

FIGS. 6A to 6D schematically illustrate from behind the rotation member 18 relative positions of the one second visual-field frame member 20, the other second visual-field frame member 22, the one first visual-field frame member 24 and the other first visual-field frame member 26 with respect to the visual field of finder 14a respectively, when the rotation member 18 is disposed in the third visual field mode setting position. FIG. 6E schematically illustrates from the front side of the fixed visual-field frame member 14 relative positions of the visual field frame right side defining arm (mask portion) 20c of the one second visual-field frame member 20, the visual field frame left side defining arm (mask portion) 22c of the other second visual-field frame member 22, the visual field frame upper side defining arm (mask portion) 24c of the one first visual-field frame member 24 and the visual field frame lower side defining arm (mask portion) 26c of the other first visual-field frame member 26 with respect to the four sides of the visual field of finder 14a respectively, when the rotation member 18 is disposed in the third visual field mode setting position.

When the rotation member 18 is rotated from the above-described first visual field mode setting position to the third visual field mode setting position as shown in FIGS. 6A to 6D, the first driving pin 18b and second driving pin 18c of the rotation member 18 are moved from the right upper position to an approximately vertically upper position with respect to the rotation center shaft 18*a*, and the third driving pin 18*d* is moved from the left lower position to an approximately vertically lower position with respect to the rotation center shaft 18*a*. During this rotation, the first driving pin 18*b* moves in the main region of the cam slot 20*e* of the one second visual-field frame member 20 and is brought into contact with the left upper end of the main region, and then moves leftward and upward with pressing the sub-region in the left direction. As a result of this, the one second visual-field frame member 20 is moved in the left direction by the predetermined distance along the pair of long sides (horizontal upper and lower sides) of the visual field of finder 14*a* from the retracted position shown in FIG. 5A. With this operation, the visual field frame right side defining arm (mask portion) 20*c* of the one first visual-field frame member 20 moves from the retracted position in the outside of the right side (one of the pair of short sides) of the visual field of finder 14*a* to the projecting position shown in FIG. 6A at which the right side defining arm (mask portion) 20*c* project into the visual field of finder 14*a* beyond the right side (one of the short sides) of the visual field of finder 14*a* and covers the right side.

At this time, the right end of the rotation center shaft escape cut 20*f* of the one second visual-field frame member 20 reaches the rotation center shaft 18*a* of the rotation member 18.

During this mode, the third driving pin 18*d* moves in the main region of the cam slot 20*e* of the other second visual-field frame member 22 and is brought into contact with the right lower end of the main region, and then moves rightward and downward with pressing the sub-region in the right direction. Thus, the third driving pin 18*d* moves the other second visual-field frame member 22 from the retracted position shown in FIG. 5B in the right direction by the predetermined distance along the pair of long sides (the horizontal upper and lower sides) of the visual field of finder 14*a*. With this operation, the visual field frame left side defining arm (mask portion) 22*c* of the other second visual-field frame member 22 moves from the retracted position in the outside of the left side (the other of the pair of short sides) of the visual field of finder 14*a* to the projecting position shown in FIG. 6B at which the left side defining arm (mask portion) 22*c* projects into the visual field of finder 14*a* beyond the left side (the other of the short sides) of the visual field of finder 14*a* and covers the left side.

At this time, the left end of the rotation center shaft escape opening 22*f* of the other second visual-field frame member 22 reaches the rotation center shaft 18*a* of the rotation member 18.

During this mode, the second driving pin 18*c* of the rotation member 18 moves in the main region of the cam slot 24*e* of the one first visual-field frame member 24 to the upper end of the main region. However, as the radius center of the main region of the cam slot 24*e* and the radius center of the movement locus of the second driving pin 18*c* coincide with each other, the one first visual-field frame member 24 does not move in the up and down directions along the pair of short sides (vertical left and right sides) from the retracted position shown in FIG. 5C when the second driving pin 18*c* moves. Thus, the visual field frame upper side defining arm (mask portion) 24*c* of the one first visual-field frame member 24 is still disposed in the retracted position in the outside of the upper side (one of the pair of long sides) of the visual field of finder 14*a* as shown in FIG. 6C.

Further, during this mode, the third driving pin 18*d* moves in the main region of the cam slot 26*e* of the other first visual-field frame member 26 to the lower end of the main region. However, as the radius center of the main region of the cam slot 26*e* and the radius center of the movement locus of the third driving pin 18*d* coincide with each other, the other first visual-field frame member 26 does not move in the up and down directions along the pair of short sides (vertical left and right sides) from the retracted position shown in FIG. 5D when the third driving pin 18*d* moves. Thus, the visual field frame lower side defining arm (mask portion) 26*c* of the other first visual-field frame member 26 is still disposed in the retracted position in the outside of the lower side (the other of the pair of long sides) of the visual field of finder 14*a* as shown in FIG. 6D.

As is clear from the above detailed description, when the rotation member 18 is disposed in the third visual field mode setting position, as shown in FIG. 6E, the visual field frame right side defining arm (mask portion) 20*c* and visual field frame left side defining arm (mask portion) 22*c* of the pair of second visual-field frame members 20 and 22 are disposed in the projecting positions respectively, and the visual field frame upper side defining arm (mask portion) 24*c* and visual field frame lower side defining arm (mask portion) 26*c* of the pair of first visual-field frame members 24 and 26 are still disposed in the retracted positions respectively.

Accordingly, when the operator looks into the eyepiece 10*e* of the finder unit 10 shown in FIG. 1 while the rotation member 18 is disposed in the third visual field mode setting position, the operator can watch a new pair of vertical left and right sides (a new pair of short sides) defined by the visual field frame right side defining arm (mask portion) 20*c* and visual field frame left side defining arm (mask portion) 22*c* of the pair of second visual-field frame members 20 and 22 located in the projecting positions projected into the visual field of finder 14*a* beyond and to cover the pair of original vertical right and left sides (the pair of original short sides) of the visual field of finder 14*a* of the fixed visual-field frame member 14, and the pair of original horizontal upper and lower sides (the pair of original long sides) of the visual field of finder 14*a*.

In the present embodiment, the ratio of the size in the vertical direction to that in the horizontal direction, that is, the ratio of the size in the width direction to that in the longitudinal direction, of the new visual field (size of which in the right and left directions are smaller than that of the original visual field of finder 14*a*) when the operator looks into the eyepiece 10*e* of the finder unit 10 while the rotation member 18 is disposed in the third visual field mode setting position, is set to approximately 1:1.5 which is called as a C-type.

Finally, the operation of the embodiment of the visual field of finder change-over apparatus of the present invention when the rotation member 18 is rotated from the above-described first visual field mode setting position illustrated in FIGS. 5A to 5D to the above described second visual field mode setting position, will be described in detail with reference to FIGS. 7A to 7E.

FIGS. 7A to 7D schematically illustrate from behind the rotation member 18 relative positions of the one second visual-field frame member 20, the other second visual-field frame member 22, the one first visual-field frame member 24 and the other first visual-field frame member 26 with respect to the visual field of finder 14*a* of the fixed visual-field frame member 14 (see FIG. 1) respectively, when the rotation member 18 is disposed in the second visual field mode setting position. FIG. 7E schematically illustrates from the front side of the fixed visual-field frame member 14 relative positions of the visual field frame right side defining arm (mask portion) 20c of the one second visual-field frame member 20, the visual field frame left side defining arm (mask portion) 22c of the other second visual-field frame member 22, the visual field frame upper side defining arm (mask portion) 24c of the one first visual-field frame member 24 and the visual field frame lower side defining arm (mask portion) 26c of the other first visual-field frame member 26 with respect to the four sides (the pair of long sides and the pair of short sides) of the visual field of finder 14a respectively, when the rotation member 18 is disposed in the second visual field mode setting position.

Figure 7A:
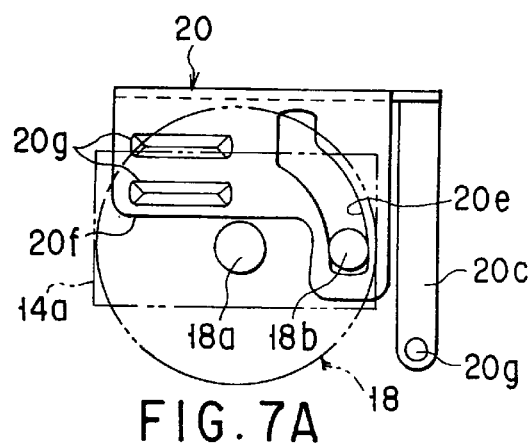
FIGS. 7A to 7D are views schematically showing a state from behind the rotation member, in which one of the pair of second visual-field frame members and the other second visual-field frame member are disposed respectively in the retracted positions and one of the pair of first visual-field frame members and the other first visual-field frame member are disposed respectively in the projecting positions with respect to the rectangular visual field of predetermined sizes of the fixed visual-field frame member, while a second visual field frame mode is being set when the rotation member is disposed in a second visual field frame setting position in the visual field of finder change-over apparatus of FIG. 2.

When the rotation member 18 is rotated from the above-described first visual field mode setting position shown in FIGS. 5A to 5D to the second visual field mode setting position as shown in FIGS. 7A to 7D, the first driving pin 18b and the second driving pin 18c of the rotation member 18 are moved from the right upper position to a horizontally right position with respect to the rotation center shaft 18a, and the third driving pin 18d is moved from the left lower position to a horizontally left position with respect to the rotation center shaft 18a. During this rotation, the first driving pin 18b moves in the main region of the cam slot 20e of the one second visual-field frame member 20 to the lower end of the main region. However, as the radius center of the main region of the cam slot 20e and the radius center of the movement locus of the first driving pin 18b coincide with each other, the one second visual-field frame member 20 does not move in the right and left directions along the pair of long sides (horizontal upper and lower sides) from the retracted position shown in FIG. 5A when the first driving pin 18b moves. Thus, the visual field frame right side defining arm (mask portion) 20c of the one second visual-field frame member 20 is still disposed in the retracted position in the outside of the right side (one of the pair of short sides) of the visual field of finder 14a as shown in FIG. 7A.

Figure 7B:
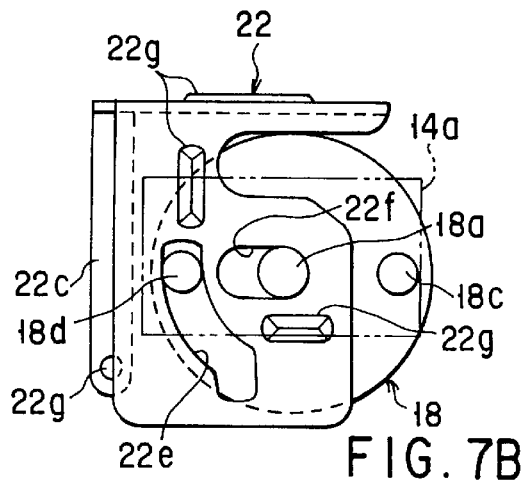
Figure 7C:
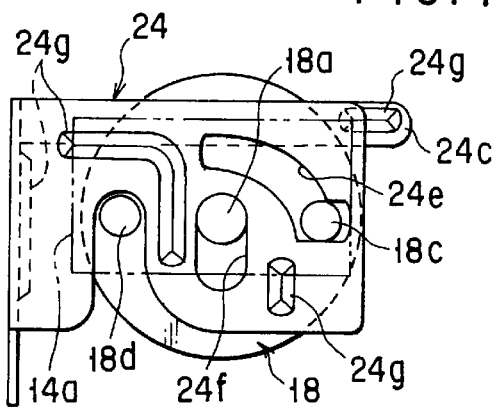
Figure 7D:
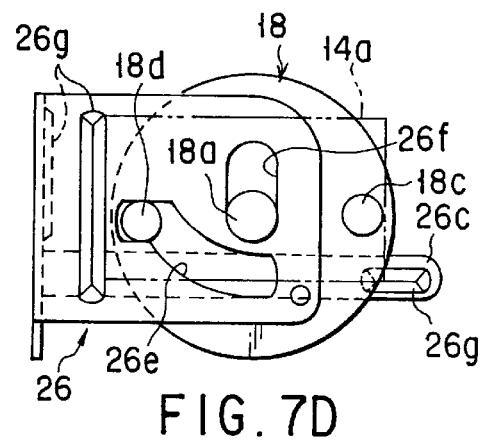
Figure 7E:
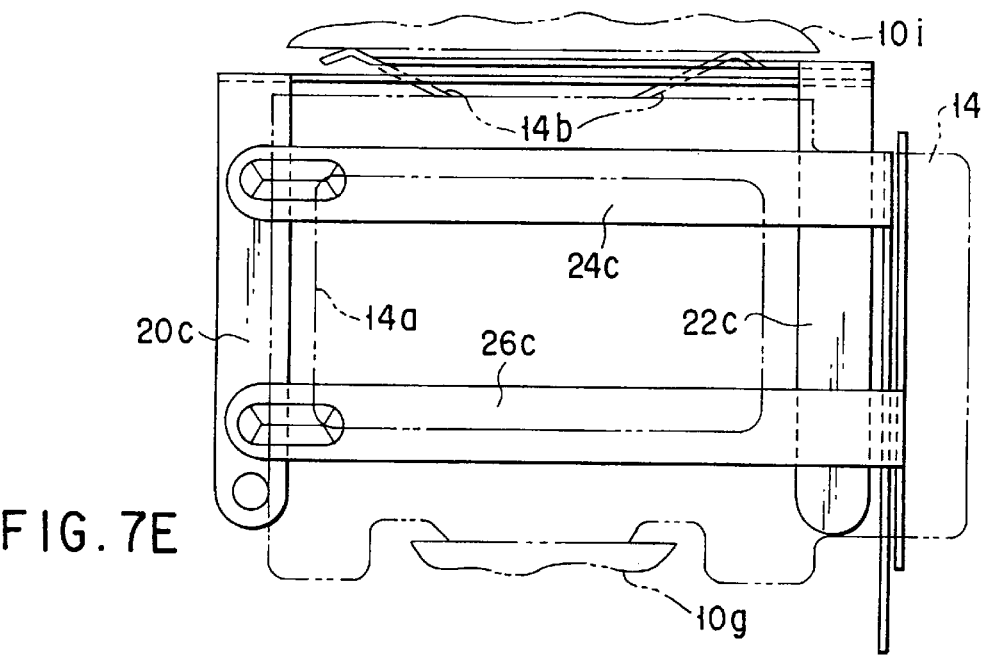
FIG. 7E is a view schematically showing the state from the front side of the fixed visual-field frame member, in which one of the pair of second visual-field frame members and the other second visual-field frame member are disposed respectively in the retracted positions and one of the pair of first visual-field frame members and the other first visual-field frame member are disposed respectively in the projecting positions with respect to the rectangular visual field of predetermined sizes of the fixed visual-field frame member, while the second visual field frame mode is being set when the rotation member is disposed in the second visual field frame setting position in the visual field of finder change-over apparatus of FIG. 2.

During this mode, the third driving pin 18d moves in the main region of the cam slot 26e of the other second visual-field frame member 22 to the upper end of the main region. However, as the radius center of the main region of the cam slot 22e and the radius center of the movement locus of the third driving pin 18d coincide with each other, the other second visual-field frame member 22 does not move in the right and left directions along the pair of long sides (horizontal upper and lower sides) from the retracted position shown in FIG. 5B when the third driving pin 18d moves. Thus, the visual field frame left side defining arm (mask portion) 22c of the other second visual-field frame member 22 is still disposed in the retracted position in the outside of the left side (the other of the pair of short sides) of the visual field of finder 14a as shown in FIG. 7B.

During this mode, the second driving pin 18c moves in the main region of the cam slot 24e of the one first visual-field frame member 24 and is brought into contact with the right end of the main region, and then moves downward and rightward with pressing the sub-region in the down direction. Thus, the second driving pin 18c moves the one first visual-field frame member 24 from the retracted position shown in FIG. 5C in the down direction by the predetermined distance along the pair of short sides (the vertical left and right sides). Thus, the visual field frame upper side defining arm (mask portion) 24c of the one first visual-field frame member 24 moves from the retracted position in the outside of the upper side (one of the pair of long sides) of the visual field of finder 14a to the projecting position shown in FIG. 7C at which the upper side defining arm (mask portion) 24c projects into the visual field of finder 14a beyond the upper side (one of the long sides) of the visual field of finder 14a and covers the upper side.

At this time, the upper end of the rotation center shaft escape opening 24f of the one first visual-field frame member 24 reaches the rotation center shaft 18a of the rotation member 18.

Further, during this mode, the third driving pin 18d moves in the main region of the cam slot 26e of the other first visual-field frame member 26 and is brought into contact with the left end of the main region, and then moves upward and leftward with pressing the sub-region in the up direction. Thus, the third driving pin 18d moves the other first visual-field frame member 26 from the retracted position shown in FIG. 5D in the up direction by the predetermined distance along the pair of short sides (the vertical left and right sides). Thus, the visual field frame lower side defining arm (mask portion) 26c of the other first visual-field frame member 26 moves from the retracted position in the outside of the lower side (the other of the pair of long sides) of the visual field of finder 14a to the projecting position shown in FIG. 7D at which the lower side defining arm (mask portion) 26c projects into the visual field of finder 14a beyond the lower side (the other of the long sides) of the visual field of finder 14a and covers the lower side.

At this time, the lower end of the rotation center shaft escape opening 26f of the other first visual-field frame member 26 reaches the rotation center shaft 18a of the rotation member 18.

As is clear from the above detailed description, when the rotation member 18 is disposed in the second visual field mode setting position, as shown in FIG. 7E, the visual field frame right side defining arm (mask portion) 20c and visual field frame left side defining arm (mask portion) 22c of the pair of second visual-field frame members 20 and 22 are still disposed in the retracted positions respectively, and the visual field frame upper side defining arm (mask portion) 24c and visual field frame lower side defining arm (mask portion) 26c of the pair of first visual-field frame members 24 and 26 are disposed in the projecting positions respectively.

Accordingly, when the operator looks into the eyepiece 10e of the finder unit 10 shown in FIG. 1 while the rotation member 18 is disposed in the second visual field mode setting position, the operator can watch the pair of original vertical right and left sides (the pair of original short sides) of the original visual field of finder 14a, and a pair of new horizontal upper and lower sides (a pair of new long sides) defined by the visual field frame upper side defining arm (mask portion) 24c and visual field frame lower side defining arm 26c of the pair of first visual-field frame members 24 and 26 located in the projecting positions projected into the visual field of finder 14a beyond and to cover the pair of original horizontal upper and lower sides (the pair of original long sides) of the visual field of finder 14a.

In the present embodiment, the ratio of the size in the vertical direction to that in the horizontal direction, that is, the ratio of the size in the width direction to that in the longitudinal direction, of the new visual field (size of which in the up and down directions are smaller than that of the original visual field of finder 14a) when the operator looks into the eyepiece 10e of the finder unit 10 while the rotation member 18 is disposed in the second visual field mode setting position, is set to approximately 1:3 which is called as a P-type.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A visual field of finder change-over apparatus for changing over a visual field of finder of a camera, comprising:
   a pair of first visual-field frame members which are movable relative to the visual field of finder in two opposite directions and each of which has an approximately arc-shaped cam slot;
   a pair of second visual-field frame members which are movable relative to the visual field of finder in further two opposite directions, the further two opposite directions crossing the above described two opposite directions, and each of which has an approximately arc-shaped cam slot; and
   a rotation member which is rotatable and has a plurality of pins fitted in the cam slots of the first and second visual-field frame members, the rotation member selectively moving the first and second visual-field frame members by a movement of the moving pins when the rotation member rotates, wherein
   at least one of the pairs of the first and second visual-field frame members is moved in accordance with the rotation of the rotation member.

2. A visual field of finder change-over apparatus for changing over a visual field of finder of a camera, comprising:
   a fixed visual-field frame member which has a rectangular opening defined by a pair of short sides and a pair of long sides;
   a pair of first visual-field frame members which are movable along the pair of short sides of the opening of the fixed visual-field frame member between retracted positions located in an outside of the opening of the fixed visual-field frame member and projecting positions projected within the opening and covering the pair of long sides;
   a pair of second visual-field frame members which are movable along the pair of long sides of the opening of the fixed visual-field frame member between retracted positions located in the outside of the opening of the fixed visual-field frame member and projecting positions projected within the opening and covering the pair of short sides;
   a visual field frame setting unit which includes an approximately arc-shaped cam slot provided in each of first and second visual-field frame members and a rotation member being rotatable and having an engagement means engaged with the cam slots, the rotation member selectively moving the first and second visual-field frame members between three modes by a movement of the engagement means when the rotation member rotates, the three modes including a first visual field frame mode in which the first visual-field frame members are disposed in the retracted positions and the second visual-field frame members are also disposed in the retracted positions, a second visual field frame mode in which the first visual-field frame members are disposed in the projecting positions and the second visual-field frame members are disposed in the retracted position, and a third visual field frame mode in which the first visual-field frame members are disposed in the retracted positions and the second visual-field frame members are disposed in the projecting position.

3. A visual field of finder change-over apparatus according to claim 2, wherein each of the cam slots has at least a portion having a radius substantially the same as a radius of a movement locus of the engagement means when the rotation member rotates, and the center of the radius of each of the cam slots and the center of the radius of the rotation locus of the engagement means of the rotation member coincide with each other while the first and second visual-field frame members are disposed in the first visual field mode.

4. A visual field of finder change-over apparatus for changing over a visual field of finder of a camera, comprising:
   four visual-field frame members each of which has an approximately arc-shaped cam slot; and
   a rotation member which is rotatable and has a driving means fitted with the cam slots and selectively moving the visual-field frame members by a movement of the driving means in accordance with the rotation of the rotation member.

5. A visual field of finder change-over apparatus according to claim 4, wherein two visual-field frame members of the four visual-field frame members move and the rest two visual-field frame members stop moving, corresponding to a movement of the driving means by the rotation of the rotation member.

6. A visual field of finder change-over apparatus for changing over a visual field of finder of a camera, comprising:
   a pair of first visual-field frame members which are movable relative to the visual field of finder in right and left directions and each of which has an approximately arc-shaped cam slot;
   a pair of second visual-field frame members which are movable relative to the visual field of finder in up and down directions and each of which has an approximately arc-shaped cam slot; and
   a rotation member which is rotatable and has pins fitted in the cam slots of the first and second visual-field frame members.

7. A visual field of finder change-over apparatus according to claim 6, wherein the cam slots of the first visual-field frame members and the cam slots of the second visual-field frame members are structured such that while either the first or second visual-field frame members move, the other visual-field frame members stop moving, corresponding to a rotation of the rotation member.

8. A visual field of finder change-over apparatus disposed within an optical path of a finder of a camera to change over a visual field of finder of the camera, comprising:
   a fixed visual-field frame member which has a rectangular opening defined by a pair of short sides and a pair of long sides;
   a pair of first visual-field frame members which are movable along the pair of short sides of the opening of the fixed visual-field frame member between retracted positions located in an outside of the opening of the fixed visual-field frame member and projecting positions projected within the opening and covering the pair of long sides;
   a pair of second visual-field frame members which are movable along the pair of long sides of the opening of the fixed visual-field frame member between retracted positions located in the outside of the opening of the fixed visual-field frame member and projecting positions projected within the opening and covering the pair of short sides; and a visual field frame setting unit which selectively moves the first and second visual-field frame members between three modes, the three modes including a first visual field frame mode in which the first visual-field frame members are disposed in the retracted positions and the second visual-field frame members are also disposed in the retracted positions, a second visual field frame mode in which the first visual-field frame members are disposed in the projecting positions and the second visual-field frame members are disposed in the retracted positions, and a third visual field frame mode in which the first visual-field frame members are disposed in the retracted positions and the second visual-field frame members are disposed in the projecting positions.

9. A visual field of finder change-over apparatus according to claim 8, wherein the visual field frame setting unit includes approximately arc-shaped cam slots provided in the pair of first visual-field frame members and the pair of second visual-field frame members respectively and a rotation member being rotatable and having an engagement means engaged with the cam slots to make the first and second visual-field frame members move by a movement of the engagement means caused by the rotation of the rotation member, and to selectively move the first and second visual-field frame members between first visual field frame mode, the second visual field frame mode and the third visual field frame mode, according to the rotation of the rotation member.

10. A visual field of finder change-over apparatus according to claim 9, wherein each of the cam slots has a portion of substantially the same shape as a movement locus of the engagement means when the rotation member rotates.

11. A visual field of finder change-over apparatus according to claim 10, wherein each of the cam slots has at least a portion having a radius substantially the same as a radius of the movement locus of the engagement means when the rotation member rotates.

12. A visual field of finder change-over apparatus according to claim 9, comprising a visual-field frame member supporting unit for supporting the first visual-field frame members and the second visual-field frame members so that the first and second visual-field frame members can be movable in two sets of mutually orthogonal directions, with the two sets of directions being substantially orthogonal with each other and with an optical axis of the finder optical path transmitted through the opening of the fixed visual-field frame member, and each set of directions facing in mutually opposite directions.

13. A visual field of finder change-over apparatus according to claim 12, wherein each of the first visual-field frame members and second visual-field frame members is formed to have a cross section having a pair of mutually facing surfaces and a bridge portion for connecting these surfaces to each other, one of the pair of surfaces has a mask portion, the mask portions covering the pair of short sides and the pair of long sides of the opening of the fixed visual-field frame member when the first visual-field frame members and the second visual-field frame members are disposed in the projecting positions and being positioned in the outside of the opening of the fixed visual-field frame member when the first visual-field frame members and the second visual-field frame members are disposed in the retracted positions, and the other of the pair of surfaces has the cam slot.

14. A visual field of finder change-over apparatus according to claim 13, wherein the mask portion of one of the pair of surfaces of each of the first and second visual-field frame members is disposed within the optical path of the finder, and the other of the pair of surfaces of each of the first and second visual-field frame members is disposed in the outside of the optical path of the finder.

15. A visual field of finder change-over apparatus according to claim 13, wherein the visual-field frame member supporting unit includes a guide slot formed in each of the first and second visual-field frame members and extending along a movement direction of each of the first and second visual-field frame members, and a fixed member having a projecting means fitted with the guide slots to guide the movement of each of the first and second visual-field frame members in the respective movement directions in cooperation with the guide slots.

16. A visual field of finder change-over apparatus according to claim 13, wherein the engagement means of the rotation member extends along the optical axis of the optical path of the finder, and the rotation member has a rotation center shaft extending along the optical axis.

17. A visual field of finder change-over apparatus according to claim 16, wherein the engagement means of the rotation member includes a plurality of pins fitted with the cam slots of the first and second visual-field frame members.

18. A visual field of finder change-over apparatus according to claim 9, wherein the finder optical path has a bending point, at least a part of each of the first and second visual-field frame members is disposed within the optical path of the finder, the rotation member is disposed in the outside of the bending point with respect to the optical path of the finder, and a portion of the optical path of the finder, the portion disposed in one side of the bending point, transmits through the opening of the fixed visual-field frame member, and the rotation member is disposed in an extension of the portion which is disposed in the one side of the bending point in the optical path of the finder, so that the rotation member is superimposed on the fixed visual-field frame member in the outside of the optical path of the finder.

* * * * *